March 20, 1956  L. M. CAMPANI  2,738,673
LIQUID VOLUME AND WEIGHT MEASURING SYSTEM
Filed June 22, 1953  2 Sheets-Sheet 1
Fig. 1.
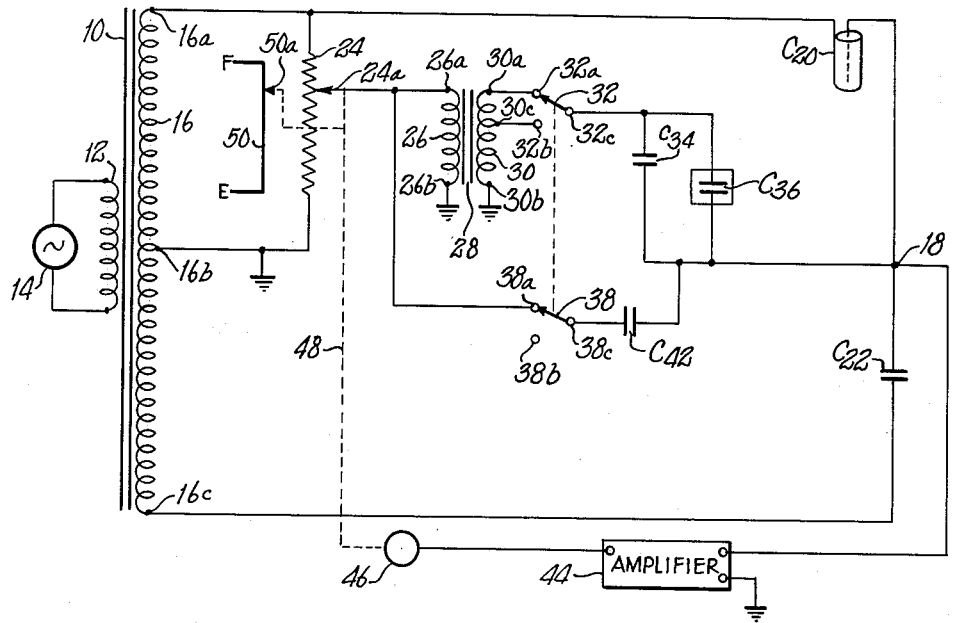
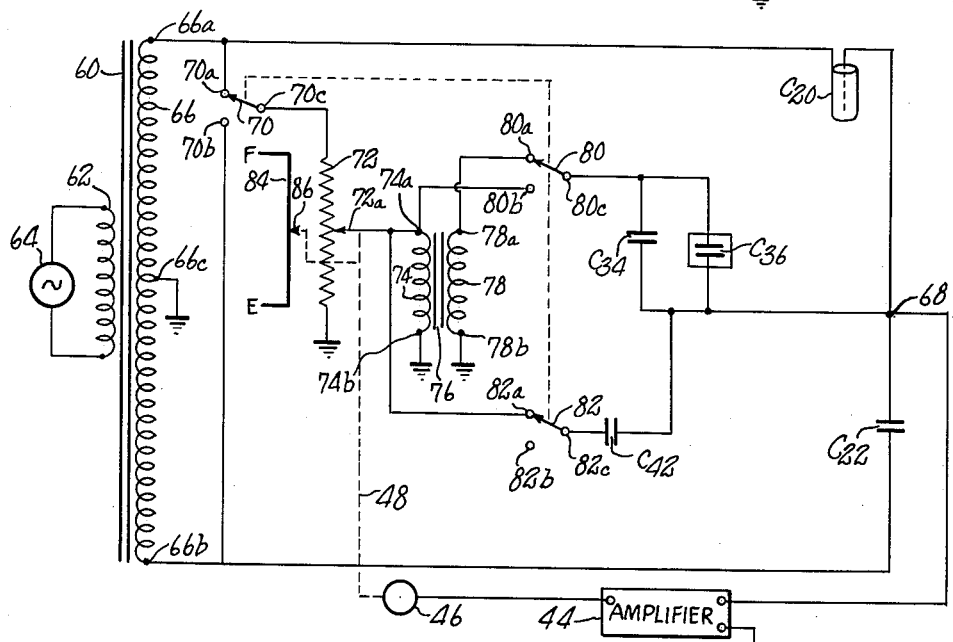
Fig. 2.
INVENTOR.
LOUIS M. CAMPANI
BY Robert L. Dunham
ATTORNEYS March 20, 1956        L. M. CAMPANI        2,738,673

LIQUID VOLUME AND WEIGHT MEASURING SYSTEM

Filed June 22, 1953        2 Sheets-Sheet 2

INVENTOR.
LOUIS M. CAMPANI
BY Robert S. Dunham
ATTORNEYS

United States Patent Office 2,738,673
Patented Mar. 20, 1956

2,738,673

LIQUID VOLUME AND WEIGHT MEASURING SYSTEM

Louis M. Campani, Freeport, N. Y., assignor to The Liquidometer Corporation, Long Island City, N. Y., a corporation of Delaware Application June 22, 1953, Serial No. 363,089

16 Claims. (Cl. 73—304)

This invention relates to liquid quantity measuring systems and more particularly to capacitor type systems adapted for the measurement of fuel quantity on either a weight or volume basis.

Certain of the capacitor type systems known to the art derive their utility in part from their ability to measure a fuel quantity as a function of weight. When used for aircraft application and under normal defueling operations, fuel quantity determination on a weight basis is highly desirable since the energy available in the fuel remaining in the tank is more closely estimated by the remaining mass of fuel than by its volume. However, for this type of measuring system, variations in the density of the fuel, render full fueling operations somewhat difficult, for it will be realized that "Full" on the indicator dial is not readily determinable. For example, a full tank with a maximum density fuel may indicate 100% of the indicator scale, but a tank actually filled with a minimum density fuel may be indicated perhaps as only 75% of the full scale reading. Intermediate densities would be proportionately spread over the intervening range. Thus the weight measuring systems are subject to the disadvantage that they do not provide a ready and convenient method of knowing when the fuel tank is completely full of fuel of any given density. Such information is highly desirable during fueling operations and is particularly valuable during in-air refueling since the purpose of these operations is to supply the maximum volume of fuel without overflowing.

Other types of capacitor systems known to the art derive their utility, at least in part, from their ability to measure a fuel quantity as a function of volume rather than weight. However, while a volume indication is preferable during fueling operations, as set forth above, for normal defueling operations a weight indication is to be preferred over a volume indication.

This invention may be briefly described as a liquid quantity measuring system of the capacitor type adapted to measure liquid quantity selectively on either a volume or a weight basis and to provide an indication of the same on a single indicating scale. The invention includes improved volume measuring systems that are simple in construction and which may be included in a combination weight-volume system in such manner that most of the components thereof perform dual functions, to the end of providing a simple unit containing a minimum number of constituent elements.

The object of this invention is to provide a liquid quantity measuring system of the capacitor type including both weight and volume measuring circuits so that the gauging system may provide selectively: a volume indication during fueling operations and a weight indication during defueling operations.

A further object of this invention is the provision of a simple and compact liquid quantity measuring system of the capacitor type adapted to read the quantity of fuel in the tank both by volume and by weight in accordance with the option of the operator.

Other objects and advantages of the invention will be pointed out in the following disclosure and claims and illustrated in the accompanying drawings which disclose, by way of example, the principle of the invention and the presently preferred embodiments of the measuring systems applying that principle.

Referring to the drawings:

Fig. 1 is a simplified circuit diagram of a gauging system for measuring fuel quantity as a function of either volume or weight;

Fig. 2 is an alternative simplified circuit for a gauging system adapted to measure fuel quantity as a function of either volume or weight;

Fig. 3 is a simplified circuit diagram of another alternative construction of a gauging system for measuring fuel quantity as a function of either volume or weight; and Fig. 4 is a fourth alternative circuit of a gauging system for measuring fuel quantity as a function of either volume or weight.

Referring to Fig. 1, the illustrated circuit is energized by means of a transformer 10 having its primary winding 12 connected to a suitable source of A. C. supply 14. The secondary winding 16 of the transformer 10 is provided with a plurality of taps such as 16a, 16b, 16c. Tap 16b may be conveniently connected to a ground reference potential and comprises the low impedance output terminal of the network. The high impedance output terminal for the network is common junction point 18.

Connected intermediate the tap 16a and the common junction point 18 is a measuring condenser $C_{20}$ which is normally immersed in the liquid in the tank being gauged to an extent dependent upon the level of said liquid. Connected intermediate the tap 16c and the common junction point 18 is a fixed reference condenser $C_{22}$. Connected between taps 16a and 16b is the resistance element of a potentiometer 24. The wiper arm 24a of potentiometer 24 is connected to a terminal 26a on the primary winding 26 of a transformer 28. The other terminal 26b of the primary winding 26 is connected to ground. The transformer 28 is provided with a secondary winding 30 having a terminal 30a connected to a switch point 32a of switch 32, a terminal 30b connected to ground, and an intermediate tap 30c connected to switch point 32b of switch 32. Disposed between the common terminal 32c of switch 32 and the common junction point 18 are two condensers $C_{34}$ and $C_{36}$. Condenser $C_{34}$ is a fixed condenser and condenser $C_{36}$ is a reference or compensating condenser the dielectric of which is that of the fuel being measured and hence is intended to be submerged in said fuel or in a representative sample thereof. The wiper arm 24a of potentiometer 24 is also connected to switch point 38a of a second switch 38. Switch point 38b of switch 38 is unconnected and the common switch point 38c is connected to the common junction point 18 through a fixed condenser $C_{42}$. Switches 32 and 38 are preferably ganged for simultaneous operation.

The output location of the measuring network, i. e. common junction point 18, is connected to an amplifier 44 which in turn controls the operation of a motor 46 normally located in the indicator. The motor 46 in turn controls the position of wiper arm 24a of potentiometer 24 through a gear train or other mechanical connection as indicated by the dotted line 48. The construction and operation of the amplifier and motor system are known to the art and are disclosed in detail in the copending application of Carl G. Sontheimer, Ser. No. 166,898, filed June 8, 1950, and will not be explained or described in detail here.

Cooperating with potentiometer 24 is an indicating scale 50 suitably calibrated for the contents of the fuel tank as represented by the measuring condenser $C_{20}$.

Index pointer 50a is preferably mechanically connected with wiper arm 24a of potentiometer 24 and indicates the position of said arm on the indicating scale 50.

When measuring on a volumetric basis, the switches 32 and 38 are disposed in upper positions, thus connecting condensers C34 and C36 in parallel between terminal 30a of the secondary winding 30 of transformer 28 and the common junction point 18 and also condenser C42 between the wiper arm 24a of potentiometer 24 and the junction point 18. When the switches 32 and 38 are positioned for volumetric measurement, the illustrated operative circuit constitutes an improved and simple volumetric measuring circuit that has decided utlity as an individual unit as well as constituting an element of the disclosed weight-volume measuring system. The volume measuring circuit is an improvement over those disclosed in the copending application Serial No. 166,898, filed June 8, 1950, by Carl G. Sontheimer.

When measuring by weight, the switches 32 and 38 are disposed in their lower positions thus connecting condensers C34 and C36 to intermediate tap 30c of the secondary 30 of transformes 28 and disconnecting condenser C42 from the circuit. When the switches are positioned for weight measurement the illustrated operative circuit is basically that disclosed in the copending application of Sontheimer and Yoder, Serial No. 177,574, filed August 4, 1950. Reference to said application may be had for a more detailed explanation of the operation of the weight measuring circuit.

The operation of the illustrated weight-volume measuring circuit is best described in conjunction with its operating equations, for which purpose we will assume for the purpose of convenience the following operating voltages: Tap 16a of transformer 10 "$+e$," tap 16c of transformer 10 "$-e$," wiper arm 24a of potentiometer 24 "$+me$," tap 30 of transformer 28 "$-m\alpha e$," and tap 30c of transformer 28 "$-me$," where "$m$"=multiplying factor determined by the setting of potentiometer 24 and "$\alpha$"=transformer ratio of transformer 28.

If the switches 32 and 38 are disposed in their upper position and the volume measuring circuit is now alone considered, the following balance equation will apply:

$$eC_{20}+meC_{42}=m\alpha e(KC_{36}+C_{34})+eC_{22} \quad (1)$$

where
$C_{20}$=capacity of measuring condenser $C_{20}$
$C_{42}$=capacity of fixed condenser $C_{42}$
$C_{36}$=capacity of reference condenser $C_{36}$ in air
$C_{34}$=capacity of fixed condenser $C_{34}$
$C_{22}$=capacity of fixed condenser $C_{22}$
$K$=dielectric constant of the fuel being gauged, and
$\alpha$=transformer ratio for transformer 28.

However, as is well known in the art, the capacity of measuring condenser $C_{20}$ can be represented at any fuel level by the following expression:

$$C_{20}=C_{20E}[1+v(K-1)] \quad (2)$$

where
$C_{20E}$=empty capacity of condenser $C_{20}$
$v$=normalized volume, and
$K$=dielectric constant of fuel being gauged.

If Equation 2 is substituted in Equation 1 and the common term "$e$" is factored out, we obtain $$C_{20E}+C_{20E}v(K-1)+mC_{42}=m\alpha(KC_{36}+C_{34})+C_{22} \quad (3)$$

If, as a design constant $C_{20E}$ is made equal to $C_{22}$, then Equation 3 reduces to the following:

$$C_{20E}v(K-1)=m\alpha\left[KC_{36}-\left(\frac{C_{42}}{\alpha}-C_{34}\right)\right] \quad (4)$$

As a design factor, the following relationship can be realized:

$$C_{34}=\frac{C_{42}}{\alpha}-C_{34} \quad (5)$$

Substituting Equation 5 in Equation 4 we get $$C_{20E}v(K-1)=m\alpha C_{36}(K-1) \quad (6)$$

Cancelling out the $(K-1)$ terms and considering the "Full" condition, where $v=1$, we get:

$$m_{vF}=\frac{C_{20E}}{\alpha C_{36}} \quad (7)$$

If the weight measuring circuit is now considered, that is, when switches 32 and 38 are disposed in their lower positions, the following balance equation will apply:

$$eC_{20}=me(KC_{36}+C_{34})+eC_{22} \quad (8)$$

where
$C_{20}$=capacity of measuring condenser $C_{20}$
$C_{36}$=capacity of reference condenser $C_{36}$
$C_{34}$=capacity of fixed condenser $C_{34}$
$C_{22}$=capacity of fixed condenser $C_{22}$, and
$K$=dielectric constant of the fuel being gauged.

Substituting Equation 2 in Equation 8 and factoring the common term "$e$," we get:

$$C_{20E}+C_{20E}v(K-1)=m(KC_{36}+C_{34})+C_{22} \quad (9)$$

If, as a design constant, $C_{22}$ is again made equal to $C_{20E}$, then Equation 9 reduces to the following:

$$m=\frac{v(K-1)}{\frac{C_{34}}{C_{20E}}+\frac{KC_{36}}{C_{20E}}} \quad (10)$$

Equation 10 represents the response of the system described as indicated by the position of the wiper arm 24a.

As is generally known for measuring circuits of this type, weight is measured on the basis of an assumed empirical relationship between the dielectric constant and the density of the group of fuels being measured. This empirical relationship is essentially a straight line and is represented by the following equation:

$$\frac{K-1}{d}=A(K-1)+B \quad (11)$$

where $K$=dielectric constant of fuel being measured
$d$=density of fuel being measured
$A$=slope of operating line, and
$B$=intercept of operating line.

Equation 11 can be more conveniently rewritten as follows:

$$d=\frac{K-1}{A(K-1)+B}=\frac{K-1}{(B-A)+KA} \quad (12)$$

Since the system is intended to respond to weight, the ideal response of the system is given by $$\text{Weight}=(\text{volume})(\text{density})=v\frac{d}{d_{max}}=m \quad (13)$$

Substituting Equation 12 in Equation 13 gives the ideal gauge response $$m_w=\frac{v(K-1)}{(B-A)d_{max}+KAd_{max}} \quad (14)$$

The symbol "$m_w$" is used here to indicate the gauge response as a function of weight. It is apparent that Equation 10 and Equation 14 represent the same condition and that by equalizing similar terms, the constants of the compensating circuit can be established in relation to the empty capacitance of the measuring condenser $C_{20}$. Thus $$\frac{C_{34}}{C_{20E}}=(B-A)d_{max} \text{ or } C_{34}=(B-A)d_{max}C_{20E} \quad (15)$$

$$\frac{C_{36}}{C_{20E}}=Ad_{max} \text{ or } C_{36}=Ad_{max}C_{20E} \quad (16)$$

Therefore, it is shown that under the specified conditions, the gauge response on a basis of weight is the product of the volume and the density of the fuel being measured. This is represented as $$m_w = v \frac{d}{d_{max}} \quad (17)$$

At "Full," $d = d_{max}$ and $v = 1$. Therefore the maximum scale response can be represented by unity as follows:

$$m_{wF} = 1 \quad (18)$$

It should be noticed that Equation 18 indicates that the full scale reading of the weight circuit is given by $m_{wF} =$ unity. Similarly Equation 17 indicates that the full scale reading of the volume circuit is given by $$m_{vF} = \frac{C_{20E}}{\alpha C_{36}}$$

Absent the transformer 28, it is apparent that the two scale lengths cannot be made to coincide except under the special condition where $C_{20E} = C_{36}$. This condition is not preferred as it is neither practical nor desirable because it requires that the empty capacity of the reference or compensating condenser be equal to the empty capacity of the measuring condenser. Practical considerations render it highly desirable that the compensating condenser be smaller than the reference condenser. Inclusion of the transformer 28 of proper characteristics renders coincidence of the weight and volume scales a practical reality.

Fig. 2 illustrates the essentials of a second circuit for measuring fuel quantity on either a weight or volume basis. The illustrated circuit is energized by means of a transformer 60 having its primary winding 62 connected to a suitable source of A. C. supply 64. The secondary winding 66 is provided with a plurality of taps, such as 66a, 66b and 66c. The tap 66c may conveniently be connected to a ground reference potential and comprises the low impedance output terminal of the network. The high impedance output terminal of the network is a common junction point 68.

Connected intermediate tap 66a and common junction point 68 is a measuring condenser $C_{20}$ (NOTE.—The same condenser designations as used in Fig. 1 will also be used here for the purposes of convenience and clarity of explanation), which is normally immersed in the liquid in the tank being gauged to an extent dependent upon the level of said liquid. Connected between the terminal 66b and the junction point 68 is a fixed reference condenser $C_{22}$. Tap 66a is also connected to switch point 70a of switch 70. Tap 66b is connected to switch point 70b of said switch 70. Common switch point 70c is connected to one end of a potentiometer 72, the other end of which is connected to ground. The wiper arm 72a of potentiometer 72 is connected to terminal 74a of primary winding 74 of a transformer 76. The other primary terminal 74b is grounded. Wiper arm 72a is also connected to switch point 80b of switch 80. One terminal 78a of secondary winding 78 of the transformer 76 is connected to switch point 80a of said switch 80. The other terminal 78b of secondary winding 78 is grounded. The common terminal 80c of switch 80 is connected to the common junction point 68 in parallel through fixed condenser $C_{34}$ and reference condenser $C_{36}$. Condenser $C_{36}$ is a reference or compensating condenser, the dielectric of which is that of the fuel being measured and hence is intended to be submerged in said fuel. The wiper arm 72a is also connected to switch point 82a of switch 82. Switch point 82b is unconnected. Common switch point 82c of switch 82 is connected to common junction point 68 through a fixed condenser $C_{42}$. Switches 70, 80 and 82 are preferably ganged for simultaneous operation as indicated by the dotted line interconnecting said switches on the drawing.

As was the case in the circuit of Fig. 1, the output location of the measuring network, i. e. common junction point 68, is connected to an amplifier 44 and motor 46 which in turn controls the position of wiper arm 72a through a gear train or other mechanical connection indicated by the dotted line 48.

Cooperating with the potentiometer 72 is an indicating scale 84 suitably calibrated for the contents of the fuel tank as represented by the measuring condenser $C_{20}$. Index pointer 86 is preferably mechanically connected to the wiper arm 72a of potentiometer 72 and is adapted visually to indicate the position of said arm.

When the described circuit is utilized for making measurements on a volumetric basis, the switches 70, 80 and 82 are each set in their upper operating position. When the circuit is utilized for making measurements on a weight basis, said switches are each set in their lower operating positions respectively.

The operation of the disclosed circuit is also best described in conjunction with its operating equations, for which purpose we will assume for the purpose of convenience that the circuit is set for volumetric measurement and the following operating voltages are provided: Tap 66a of transformer 60 "$+e$," tap 66b of transformer 60 "$-e$," wiper arm 72a of potentiometer 72 "$+me$," terminal 78a of secondary 78 of transformer 76 "$-m\alpha e$," where "$m$" = multiplying factor determined by the setting of the potentiometer 72 and "$\alpha$" = transformer ratio of transformer 76.

The balance equation of the circuit under volume measuring conditions will be as follows:

$$eC_{20} + meC_{42} = m\alpha e(KC_{36} + C_{34}) + eC_{22} \quad (19)$$

This equation is the same as that of Equation 1 and hence the derivation set forth above with respect to Equation 1 will produce the same result.

When measuring by weight, switches 70, 80 and 82 will be set in their lower operating positions which effectively disconnects condenser $C_{42}$ from the circuit. The balance equation of the circuit when set for weight measurements is as follows:

$$eC_{20} = me(KC_{36} + C_{34}) + eC_{22} \quad (20)$$

The latter equation is identical with Equation 8 and the derivation set forth above with respect to Equation 8 will produce the same result. In this connection, it should be noticed that the circuit of Fig. 2 produces the same response as the circuit illustrated in Fig. 1, but in the case of the former, the phase reversing transformer is not used during the weight measuring operation.

Fig. 3 illustrates a third circuit which will measure either on a volume or weight basis. The circuit is energized by a transformer 94 having its primary winding 96 connected to a suitable source of A. C. supply 98. The secondary winding 100 of transformer 98 is provided with a plurality of taps 100a, 100b, 100c and 100d. Tap 100b may be conveniently connected to a ground reference potential and serves as the low impedance output terminal of the network. The high impedance output terminal for the network is the common junction point 102.

Connected between tap 100a and the common junction point 102 is a measuring condenser $C_{20}$ which is normally immersed in the liquid in the tank being gauged to an extent dependent upon the level of said liquid. Tap 100c is connected to common junction point 102 through a fixed condenser $C_{22}$. Tap 100c is also connected to switch point 110a of switch 110. Tap 100d is connected to switch point 110b of switch 110. Connected between taps 100a and 100b is a potentiometer 104. Connected between tap 100b and common switch point 110c of switch 110 is a second potentiometer 106. The wiper arm 106a of potentiometer 106 is connected to common junction point 102 in parallel through a fixed condenser $C_{34}$ and through a reference or compensating condenser $C_{36}$, the dielectric of which is that of the fuel being measured and hence is intended to be submerged in the fuel. Wiper arm 104a of potentiometer 104 is connected to switch point 108a through a fixed condenser $C_{42}$. Switch point $108b$ is unconnected and common switch point $108c$ of switch $108$ is connected to common junction point $102$.

The output location of the network, i. e. common junction point $102$ is connected to an amplifier $44$ which in turn controls a motor $46$ normally located in the indicator. The motor $46$ in turn controls the position of the wiper arms $104a$ and $106a$ through a gear train or other mechanical connection as indicated by the dotted line $48$, these arms moving in respectively opposite directions on the wiring diagram as shown.

Switches $108$ and $110$ are preferably ganged together as shown by the dotted line $112$. When switch $108$ is connected to switch point $108b$ and switch $110$ is connected to switch point $110a$, the resulting circuit is a weight measuring circuit of the prior art as disclosed in the copending application of Sontheimer and Yoder, Serial No. 177,574, filed August 4, 1950. Similarly, when switch $108$ is connected to switch point $108a$ and switch $110$ is placed in contact with switch point $110b$, the resulting circuit is a volume measuring circuit of the prior art as disclosed in the copending application of Carl G. Sontheimer, Ser. No. 166,898, filed June 8, 1950.

The operation of this weight-volume measuring circuit is also best described in conjunction with its operating equations for which purpose we will assume the following operating voltages: Tap $100a$ has a potential "$+e$," tap $100b$ is at ground potential, tap $100c$ "$-e$," tap $100d$ "$-\beta e$," the wiper arm $104a$ "$+me$" and wiper arm $106a$ "$-me$" when switch $110$ is connected to point $110a$ and "$m\beta e$" when the switch is connected to point $110b$. If the circuit is connected for weight measurement, condenser $C_{42}$ is disconnected from the circuit and the end of potentiometer $106$ is connected to tap $100c$. Under this condition the balance equation for the circuit is:

$$eC_{20} = me(KC_{36} + C_{34}) + eC_{22} \quad (21)$$

This latter equation is identical with that of Equation 8 and by similar treatment reduces to the response of $$m_{wF} = 1 \quad (22)$$

When the circuit is connected for volume measurement, condenser $C_{42}$ is connected in the circuit and the free end of potentiometer $106$ is connected to tap $100d$. Under this condition the balance equation is as follows:

$$eC_{20} + meC_{42} = m\beta e(KC_{36} + C_{34}) + eC_{22} \quad (23)$$

This latter equation is essentially similar to Equation 1 and differs only in the voltage factor $\beta$ as compared with the transformer ratio factor $\alpha$ in Equation 1. By similar treatment Equation 23 is reduced to $$m_{vF} = \frac{C_{20E}}{\beta C_{36}} \quad (24)$$

It will be realized upon examination that the circuit of Fig. 3 attempts to combine the prior art weight and volume measuring circuits as noted above. However, these circuits as disclosed in the art cannot be combined directly. It must be noted that Equation 22 indicates that the full scale reading of the weight circuit is given by $m_{wF}=$unity. Similarly Equation 24 indicates that the full scale reading of the volume circuit is given by $$m_{vF} = \frac{C_{20E}}{\beta C_{36}}$$

Hence, it is apparent that the two scale lengths cannot be made to coincide except under the special condition where $C_{20E}$ is equal to $C_{36}$. This condition is not preferred for it is neither practical nor desirable as it requires that the capacity of the compensating condenser be equal to the empty capacity of the measuring condenser. For practical reasons, it is usually desired that the capacity of the compensating condenser be smaller than the capacity of the measuring condenser. This practical difficulty is overcome by the inclusion of the extra tap $100d$ on the secondary winding $100$ of transformer $94$ and the provision of switch $110$, which in combination provides for the utilization of the voltage factor $\beta$ and effects the necessary flexibility for practical design. The value of $\beta$ can readily be selected so that the volume response at "Full" will be unity for any range of capacitive values for condensers $C_{20E}$ and $C_{36}$, and hence establish that the scale lengths on both a weight and volume basis will coincide. The particular value of $\beta$ that will make this condition realizable may be established from the following relation:

$$\beta = \frac{C_{20E}}{C_{36}} \quad (25)$$

By substituting Equation 16 into Equation 25 a more general solution is obtained:

$$\beta = \frac{1}{A d_{max}} \quad (26)$$

where $A=$slope of operating line, and $d_{max}=$maximum density for which the system is designed. It will therefore be appreciated that the addition of an additional source of voltage of the proper proportions will permit a gauging system which can be selectively used for the measurement of either the weight or volume of a body of fuel.

Fig. 4 illustrates an alternative circuit arrangement incorporating the principles and advantages of the measuring system disclosed in the copending application of Louis M. Campani, Ser. No. 324,288, filed December 5, 1952, as modified in accordance with the principles of this invention to provide a measuring system adapted for the selective measurement of either weight or volume in accordance with the desires of the operator.

Referring to the drawing, the illustrated circuit includes a power unit $118$ containing a transformer $120$ having its primary winding $122$ connected through a switch $124$ to a suitable source of A. C. supply $126$. The secondary winding $128$ of transformer $120$ is provided with terminal taps $128a$ and $128g$ and is intermediately tapped at $128b$, $128c$, $128d$, $128e$ and $128f$, respectively. Connected between terminal $128a$ and tap $128b$ is a potentiometer $130$ which serves as the "Full" adjustment of the system. Connected between taps $128e$ and $128f$ is a potentiometer $132$ which serves as the "Empty" adjustment of the system. Connected between terminal $128a$ and tap $128c$ is a potentiometer $134$. Tap $128d$ is connected to a suitable reference potential such as ground and serves as the low impedance output terminal of the network. Common junction point $136$ serves as the high impedance output terminal of the network.

Connected between the wiper arm $134a$ of potentiometer $134$ and the common junction point $136$ is a fixed condenser $C_{22}$. Connected between the terminal $128g$ of transformer $120$ and the common junction point $136$ is a measuring condenser $C_{20}$ which is normally immersed in the liquid in the tank being gauged to an extent dependent upon the level of said liquid. Connected intermediate the wiper arm $130a$ of potentiometer $130$ and wiper arm $132a$ of potentiometer $132$ is a potentiometer $138$ which is normally located in the indicator $140$ remote from the power unit $118$.

The wiper arm $138a$ of potentiometer $138$ is connected to switch point $142a$ of switch $142$ physically located in an intermediate adaptor unit $144$. Disposed within the adaptor unit $144$ is a transformer $146$ having a terminal $148a$ of its primary winding $148$ connected to switch point $142b$ of switch $142$. The primary winding $148$ is also tapped as at $148b$, this tap being connected to said switch point $142a$. The common switch point $142c$ is connected to the common junction point $136$ in the power unit $118$ in parallel through a compensating condenser $C_{36}$ and through a fixed condenser $C_{34}$. Terminal $150a$ of the secondary winding $150$ is connected to a switch point $152a$ of a switch $152$. Switch point $152b$ is unconnected and the common switch point $152c$ is connected to the common junction point $136$ through a fixed condenser $C_{42}$. The terminals of the primary $148$ and secondary $150$ of the transformer 146 opposite the terminals 148a and 150a respectively are grounded.

The output locality of the network, i. e. common junction point 136, is preferably connected to an amplifier 44 located in the power unit 118 which in turn is connected to a motor 46 located in the indicator unit 140. The motor 46 in turn controls the position of the wiper arm 138a of the potentiometer 138 through a gear train or other mechanical connection as indicated by the dotted line 48. Cooperating with the potentiometer 138 is an indicating scale 154 suitably calibrated for the contents of the fuel tank as represented by the measuring condenser $C_{20}$. The indicating scale 154 is provided with an index pointer 154a which is preferably mechanically connected to the wiper arm 138a of potentiometer 138 and indicates the position of said arm on the indicating scale 154.

In the above described circuit, the circuit elements forming the power unit are contained within the dotted line 118, the circuit elements contained in the fuel tank are disposed within the dotted line 156, the circuit elements located in the indicator are contained within the dotted line 140, and the circuit elements forming the adaptor unit are contained within the dotted line 144.

When measuring on a weight basis, switches 142 and 152 are in their lower position and the described circuit is identical with the weight measuring circuit described in the copending application of Louis M. Campani, Serial No. 324,288, as set forth above. When the switches 142 and 152 are so positioned, the fixed condenser $C_{42}$ is disconnected from the circuit and the wiper arm 138a of potentiometer 138 is directly connected to the common junction point 136 in parallel through condensers $C_{34}$ and $C_{36}$. In the power unit 118 potentiometer 134 is adjusted so that, in combination with fixed condenser $C_{22}$, it will balance out the empty capacity of the measuring condenser $C_{20}$. Potentiometer 132 is adjusted so that when the wiper arm 138a of potentiometer 138 in the indicator 140 corresponds to "Empty" on scale 154, the voltage on said wiper arm will be at some convenient reference potential such as ground.

The operation of the illustrated circuit is best described in conjunction with its operating equations for which purpose we will assume as a matter of convenience the following operating voltages: Terminal 128g of transformer 120 "$-e$," wiper arm 130a of potentiometer 130 is adjusted to have a voltage "$+e$," wiper arm 138a of potentiometer 138 "$+me$." Under these conditions the balance equation for weight measurement can be written as follows:

$$eC_{20} = me(KC_{36} + C_{34}) + eC_{22} \quad (27)$$

This equation will be found to be identical with Equation 8 and hence reduces to the following expression at "Full" as developed for Equation 18, that is, $$m_{wF} = 1 \quad (28)$$

When the illustrated circuit is used to make measurements on a volume basis, switches 142 and 152 are set in their upper positions respectively. Under this operating condition, wiper arm 138a of potentiometer 138 is connected to the low impedance side of condensers $C_{34}$ and $C_{36}$ through the portion of the primary winding 148 contained between taps 148a and 148b thereof. Terminal 150a of secondary winding 150 is connected to the low impedance side of condenser $C_{42}$ through switch 152. The high impedance side of condenser $C_{42}$ is connected to the common junction point 136.

The operation of the volume circuit is also best described in conjunction with its operating equations, for which purpose we will assume for convenience the following operating voltages. As in the weight measuring circuit, wiper arm 130a of potentiometer 130 has a potential "$+e$," terminal 128g of transformer 120 "$-e$," wiper arm 138a of potentiometer 138 "$+me$." The windings of transformer 146 are designed so that its operating voltages will be "$+me$" at tap 148b, "$+mae$" at tap 148a through autotransformer action and "$-me$" at terminal 150a of secondary winding 150, the phase reversal being obtained through well-known transformer action.

The balance equation for the volume measuring circuit can be written as follows:

$$eC_{20} + meC_{42} = mae(KC_{36} + C_{34}) + eC_{22} \quad (29)$$

This latter equation is the same as that of Equation 1 and the circuit will have the same response as there derived. It is therefore apparent that the circuit of Fig. 4 can be used to measure a quantity of fuel either on a weight or volume basis; and moreover that an adapting circuit for the combined volume-weight measuring feature as included in the adaptor unit 144 can be readily added to the measuring system disclosed in said copending application, Serial No. 324,288 to provide a compact unit which is readily adapted for measuring fuel quantity on either a weight or volume basis.

As a further aid in understanding the underlying principles of the invention the following tabulation presents in concise form the relative magnitudes of the potentials applied to certain of the circuit elements together with a positive and negative indication of the relative phase relationships occurring during operation:

|  | $C_{20}$ | $C_{22}$ | $C_{36}$ Volume Measurement | Weight Measurement | $C_{42}$ |
|---|---|---|---|---|---|
| Fig. 1 | $+e$ | $-e$ | $-mae$ | $-me$ | $+me$ |
| Fig. 2 | $+e$ | $-e$ | $-mae$ | $-me$ | $+me$ |
| Fig. 3 | $+e$ | $-e$ | $-m\beta e$ | $-me$ | $+me$ |
| Fig. 4 | $-e$ | $+e$ | $+mae$ | $+me$ | $-me$ |

In accordance with the provisions of the patent statutes, I have herein described the principle of operation of this invention, together with the elements which I now consider to constitute a workable embodiment thereof, but I desire to have it understood that the structures disclosed are only illustrative and the invention can be carried out by other means. Also, while it is designed to use the various features and elements in the combinations and relations described, some of these may be altered and modified without interfering with the more general results outlined.

Having thus described my invention, I claim:

1. A measuring system for determining the quantity of liquid in a tank selectively in terms of volume or weight, wherein a substantially fixed relationship exists between the dielectric constant and the density of the liquid, comprising a first source of alternating voltage, a first reactance member connected intermediate said first source of alternating voltage and a common measuring point to produce a signal of a first phase at said measuring point, the reactance of said first reactance member being a predetermined function of the volume and of the dielectric constant of the liquid being measured, a second source of alternating voltage of a second phase which is opposite that of said first source, a second reactance member connected intermediate said second source of alternating voltage and said common measuring point to produce a signal of a second phase at said measuring point, a third source of variable alternating voltage, which is of a phase opposed to that of said first source, a third corrective reactance member connected between said third source of alternating voltage and said common measuring point, a fourth source of alternating voltage which is in phase with said first source, a fourth reactance member connected as herein set forth intermediate said fourth source of voltage and said common measuring point, said third and fourth reactance members and their connections producing signals of opposing phases at said measuring point; two-position selective switching means, including a first switch for selectively controlling the amplitude of the voltage supplied by said third source to said third reactance member in accordance with whether the system is to be used for measuring the quantity of liquid in the tank in terms of weight or volume respectively, and said switching means including a second switch for selectively connecting said fourth source and said fourth reactance member only when said system is used for measuring the quantity of liquid in terms of volume and for disconnecting said fourth source from said fourth reactance member when said system is used for measuring the quantity of liquid in terms of weight; signal responsive means, means connecting said signal responsive means to said common measuring point to apply to said signal responsive means an output signal which is a resultant of the signals from all said sources which are connected to said common measuring point, and means actuated by said signal responsive means simultaneously to vary the voltage of said third and said fourth sources in a direction tending to reduce the resultant output signal at said common measuring point substantially to zero.

2. A measuring system in accordance with claim 1, in which all said sources of alternating voltage are of the same frequency, and in which said first and said second sources are opposite end portions of a transformer secondary, a middle portion of which secondary is at a ground reference potential.

3. A measuring system in accordance with claim 1, in which all said sources of alternating voltage are at the same frequency, and in which all said sources derive A. C. energy from the secondary of a transformer, a middle portion of which is at a ground reference potential.

4. A measuring system in accordance with claim 1, in which the potential of said third and said fourth sources is simultaneously varied as aforesaid by said signal responsive means by varying the setting of a single potentiometer, the slider of which is connected to provide A. C. energy to said third and said fourth sources.

5. A measuring system in accordance with claim 1, in which all said reactances are condensers, in which the condenser constituting said first reactance is arranged in the container for the liquid to be measured so that the liquid is disposed between the plates of the condenser to a height dependent upon the level of the liquid in the container, so that the capacitance of this condenser is a function of the volume and of the dielectric constant of the liquid to be measured, and in which the condenser constituting said third reactance is totally immersed in a representative sample of said liquid, so that the capacitance thereof is a function solely of the dielectric constant of said liquid.

6. A measuring system for determining the quantity of liquid in a tank selectively in terms of volume or weight, wherein a substantially fixed relationship exists between the dielectric constant and the density of the liquid, comprising a first source of alternating voltage, a first reactance member connected intermediate said first source of alternating voltage and a common measuring point to produce a signal of a first phase at said measuring point, the reactance of said first reactance member being a predetermined function of the volume and of the dielectric constant of the liquid being measured, a second source of alternating voltage of a second phase which is opposite that of said first source, a second reactance member connected intermediate said second source of alternating voltage and said common measuring point to produce a signal of a second phase at said measuring point, a third source of variable alternating voltage, which is of a phase opposed to that of said first source, said third source including a phase-reversing transformer, a third corrective reactance member connected between said third source of alternating voltage and said common measuring point, a fourth source of alternating voltage which is in phase with said first source, a fourth reactance member connected as herein set forth intermediate said fourth source of voltage and said common measuring point, said third and fourth reactance members and their connections producing signals of opposing phases at said measuring point; and two-position selective switching means, including a first switch for selectively controlling the amplitude of the voltage supplied by said third source to said third reactance member in accordance with whether the system is to be used for measuring the quantity of liquid in the tank in terms of weight or volume respectively, said phase-reversing transformer, said first switch and the connections therebetween and to said third reactance member being so constructed and arranged that the voltage applied to said third reactance member during volume measurement will bear a predetermined ratio to the voltage applied to said third reactance member during weight measurement, and said switching means including a second switch for selectively connecting said fourth source and said fourth reactance member only when said system is used for measuring the quantity of liquid in terms of volume and for disconnecting said fourth source from said fourth reactance member when said system is used for measuring the quantity of liquid in terms of weight; signal responsive means, means connecting said signal responsive means to said common measuring point to apply to said signal responsive means an output signal which is a resultant of the signals from all said sources which are connected to said common measuring point, and means actuated by said signal responsive means simultaneously to vary the voltage of said third and said fourth sources in a direction tending to reduce the resultant output signal at said common measuring point substantially to zero.

7. A measuring system for determining the quantity of liquid in a tank selectively in terms of volume or weight, wherein a substantially fixed relationship exists between the dielectric constant and the density of the liquid, comprising a first source of alternating voltage, a first reactance member connected intermediate said first source of alternating voltage and a common measuring point to produce a signal of a first phase at said measuring point, the reactance of said first reactance member being a predetermined function of the volume and of the dielectric constant of the liquid being measured, a second source of alternating voltage of a second phase which is opposite that of said first source, a second reactance member connected intermediate said second source of alternating voltage and said common measuring point to produce a signal of a second phase at said measuring point, a potentiometer connected to provide a variable alternating voltage of the same frequency as that of said first and said second sources, a phase-reversing transformer connected to the variable tap of said potentiometer and serving to provide a third source of alternating voltage which is opposed in phase to said first source, a third corrective reactance member connected between said third source of alternating voltage and said common measuring point, a fourth source of alternating voltage also energized from said variable tap of said potentiometer to provide A. C. energy at a potential determined by the setting of said tap and in phase with said first source, a fourth reactance member connected as herein set forth intermediate said fourth source of voltage and said common measuring point, said third and fourth reactance members and their connections producing signals of opposing phases at said measuring point; and two-position selective switching means, including a first switch for selectively controlling the amplitude of the voltage supplied by said third source to said third reactance member in accordance with whether the system is to be used for measuring the quantity of liquid in the tank in terms of weight or volume respectively, said phase-reversing transformer, said first switch and the connections therebetween and to said third reactance member being so constructed and arranged that the voltage applied to said third reactance member during volume measurement will bear a predetermined ratio to the voltage applied to said third reactance member during weight measurement, and said switching means including a second switch for selectively connecting said fourth source and said fourth reactance member only when said system is used for measuring the quantity of liquid in terms of volume and for disconnecting said fourth source from said fourth reactance member when said system is used for measuring the quantity of liquid in terms of weight; signal responsive means, means connecting said signal responsive means to said common measuring point to apply to said signal responsive means an output signal which is a resultant of the signals from all said sources which are connected to said common measuring point, and means actuated by said signal responsive means simultaneously to vary the voltage of said third and said fourth sources in a direction tending to reduce the resultant output signal at said common measuring point substantially to zero by varying the setting of the variable tap of said potentiometer.

8. A measuring system in accordance with claim 7, in which said third source comprises two spaced points on the secondary winding of said phase-reversing transformer, which are selectively connected by said first switch to said third reactance member in accordance with whether the system is to be used for measuring the quantity of liquid in the tank in terms of weight or volume respectively.

9. A measuring system in accordance with claim 8, in which one end of each winding of said phase-reversing transformer is grounded, the opposite end of the primary winding being connected to said variable tap of said potentiometer; in which said third reactance member comprising a condenser, the plates of which are immersed in a representative sample of the liquid being measured, so that its capacitance varies solely as a function of the dielectric constant of this liquid; in which said first reactance member comprises a condenser immersed in the liquid being measured to a degree depending upon the height of the liquid in the tank, so that its capacitance is a joint function of the volume and of the dielectric constant of the liquid; and in which said fourth source is connected directly to said tap of said potentiometer, said potentiometer being connected between said first source and ground.

10. A measuring system for determining the quantity of liquid in a tank selectively in terms of volume or weight, wherein a substantially fixed relationship exists between the dielectric constant and the density of the liquid, comprising a first source of alternating voltage, a first reactance member connected intermediate said first source and a common measuring point to produce a signal of a first phase at said measuring point, the reactance of said first reactance member being a predetermined function of the volume and of the dielectric constant of the liquid being measured, a second source of alternating voltage of a second phase, which is opposite that of said first source, a second reactance member connected intermediate said second source of alternating voltage and said common measuring point to produce a signal of a second phase at said measuring point, a potentiometer connected to provide a variable alternating voltage of the same frequency as that of said first and said second sources, a phase-reversing transformer connected to the variable tap of said potentiometer and serving to provide a third source of alternating voltage which is opposed in phase to said first source, a third corrective reactance member connected between said third source of alternating voltage and said common measuring point, a fourth source of alternating voltage also energized from said variable tap of said potentiometer to provide A. C. energy at a potential determined by the setting of said tap and in phase with said first source, a fourth reactance member connected as herein set forth intermediate said fourth source of voltage and said common measuring point, said third and fourth reactance members and their connections producing signals of opposing phases at said measuring point; and two-position selective switching means, including a first switch for selectively connecting said third reactance member to the primary or secondary of said phase-reversing transformer in accordance with whether the system is to be used for measuring the quantity of liquid in the tank in terms of weight or volume respectively, a second switch constituting a part of said switching means for selectively connecting said fourth source and said fourth reactance member only when said system is used for measuring the quantity of liquid in terms of volume and for disconnecting said fourth source from said fourth reactance member when said system is used for measuring the quantity of liquid in terms of weight, and a third switch for selectively connecting one end of said potentiometer to said first or to said second sources in accordance with whether the system is to be used for measuring the quantity of liquid in the tank in terms of volume or weight respectively, the other end of said potentiometer being grounded; signal responsive means, means connecting said signal responsive means to said common measuring point to apply to said signal responsive means an output signal which is a resultant of the signals from all said sources which are connected to said common measuring point, and means actuated by said signal responsive means simultaneously to vary the voltage of said third and said fourth sources in a direction tending to reduce the resultant output signal at said common measuring point substantially to zero by varying the setting of the variable tap of said potentiometer.

11. A measuring system in accordance with claim 10, in which each of said reactance members is a condenser, in which the condenser constituting said first reactance member is disposed in contact with the liquid to be measured, so as to be immersed therein to an extent depending upon the level of the liquid, and in which the condenser constituting said third reactance member is totally immersed in a representative sample of the liquid being measured.

12. A measuring system for determining the quantity of liquid in a tank selectively in terms of volume or weight, wherein a substantially fixed relationship exists between the dielectric constant and the density of the liquid, comprising a power transformer, the secondary winding of which has a mid-position connected to a ground reference potential, one end portion of said secondary winding constituting a first source of alternating voltage, a first reactance member connected intermediate said first source of alternating voltage and a common measuring point to produce a signal of a first phase at said measuring point, the reactance of said first reactance member being a predetermined function of the volume and of the dielectric constant of the liquid being measured, the other end portion of said secondary winding constituting a second source of alternating voltage of a second phase which is opposed to that of said first source, a second reactance member connected intermediate said second source of alternating voltage and said common measuring point to produce a signal of a second phase at said common measuring point, a first potentiometer resistance connected between different selected points adjacent to the second named end portion of said secondary winding and ground and having a variable tap constituting a third source of variable alternating voltage, which is of a phase opposed to that of said first source, a third corrective reactance member connected between said third source of alternating voltage and said common measuring point, a second potentiometer connected between said first source and ground and having a tap constituting a fourth source of alternating voltage, which is in phase with said first source, a fourth reactance member connected as herein set forth intermediate said fourth source of voltage and said common measuring point, said third and fourth reactance members and their connections producing signals of opposing phases at said measuring point; two-position switching means including a first switch for selectively controlling the amplitude of the voltage supplied by said third source to said third reactance member in accordance with whether the system is to be used for measuring the quantity of liquid in the tank in terms of weight or volume respectively, said first switch serving selectively to connect the end of said first potentiometer to different points adjacent to the end of said secondary winding respectively, and said switching means including a second switch for selectively connecting said fourth source and said fourth reactance member only when said system is used for measuring the quantity of liquid in terms of volume and for disconnecting said fourth source from said fourth reactance member when said system is used for measuring the quantity of liquid in terms of weight; signal responsive means, means connecting said signal responsive means to said common measuring point to apply to said signal responsive means an output signal which is a resultant of the signals from all of said sources which are connected to said common measuring point, and means actuated by said signal responsive means simultaneously to vary the voltage of said third and said fourth sources in a direction tending to reduce the resultant output signal at said common measuring point substantially to zero by simultaneously adjusting the taps on said first and second potentiometers toward and away from the grounded ends thereof respectively.

13. A measuring system in accordance with claim 12, in which all said reactance members are condensers, in which the condenser constituting said first reactance member is disposed in the tank containing the liquid to be measured, so as to be immersed in the liquid to an extent dependent upon the level of the liquid in the tank, and in which the condenser constituting said third reactance member is immersed in a representative sample of the liquid.

14. A measuring system for determining the quantity of liquid in a tank selectively in terms of volume or weight, wherein a substantially fixed relationship exists between the dielectric constant and the density of the liquid, comprising a power transformer, the secondary winding of which has a mid-position connected to a ground reference potential, one end portion of said secondary winding constituting a first source of alternating voltage, a first reactance member connected intermediate said first source of alternating voltage and a common measuring point to produce a signal of a first phase at said measuring point, the reactance of said first reactance member being a predetermined function of the volume and of the dielectric constant of the liquid being measured, the other end portion of said secondary winding constituting a second source of alternating voltage of a second phase which is opposed to that of said first source, a second reactance member connected intermediate said second source of alternating voltage and said common measuring point to produce a signal of a second phase at said common measuring point, a potentiometer resistance connected between spaced points on said transformer secondary to provide at its variable tap an adjustable potential which is in phase with the potential at said second source, a phase-reversing transformer having a predetermined point on its primary winding connected to said variable tap of said potentiometer, selected points on said primary winding of said phase-reversing transformer constituting a third source of alternating voltage which is opposite in phase to that of said first source, the primary and secondary windings of said phase-reversing transformer each having one end grounded, a third corrective reactance member connected intermediate said third source of alternating voltage and said common measuring point, the end of the secondary winding of said phase-reversing transformer which is remote from ground constituting a fourth source of alternating voltage which is in phase with said first source, a fourth reactance member connected as herein set forth intermediate said fourth source of voltage and said common measuring point, said third and fourth reactance members and their connections producing signals of opposing phases at said measuring point; and two-position selective switching means, including a first switch for selectively connecting said third reactance member to two different spaced points on the primary winding of said phase-reversing transformer in accordance with whether the system is to be used for measuring the quantity of liquid in the tank in terms of weight or volume respectively, a second switch constituting a part of said switching means for selectively connecting said fourth source and said fourth reactance member only when said system is used for measuring the quantity of liquid in terms of volume and for disconnecting said fourth source from said fourth reactance member when said system is used for measuring the quantity of liquid in terms of weight; signal responsive means, means connecting said signal responsive means to said common measuring point to apply to said signal responsive means an output signal which is a resultant of the signals from all said sources which are connected to said common measuring point, and means actuated by said signal responsive means simultaneously to vary the voltage of said third and said fourth sources in a direction tending to reduce the resultant output signal at said common measuring point substantially to zero by varying the setting of the variable tap of said potentiometer.

15. A measuring system in accordance with claim 14, in which each of said reactance members is a condenser, in which the condenser constituting said first reactance member is disposed in the tank containing the liquid to be measured so as to be immersed in this liquid to an extent dependent upon the level thereof, and in which the condenser constituting said third reactance member is immersed in a representative sample of the liquid being measured.

16. A measuring system for determining the quantity of liquid in a tank in accordance with claim 14, in which one of said first and said second sources comprises a potentiometer connecting across an end portion of the secondary winding of the power transformer, the tap of this potentiometer constituting the respective power source, so as to compensate for variations in manufacturing of the several parts; and in which the potentiometer which has its variable tap connected to said phase-reversing transformer is in turn connected at the ends of the potentiometer resistance thereof to variable taps of potentiometers which in turn have their resistances connected across predetermined portions of the secondary winding of said power transformer, so as to provide set-up adjustments.

References Cited in the file of this patent

UNITED STATES PATENTS

| | | |
|---|---|---|
| 2,188,628 | Freystedt | Jan. 30, 1940 |
| 2,300,562 | Freystedt | Nov. 3, 1942 |
| 2,541,743 | Brockman | Feb. 13, 1951 |
| 2,563,280 | Schafer | Aug. 7, 1951 |
| 2,563,281 | Griffith | Aug. 7, 1951 |
| 2,581,085 | Edelman | Jan. 1, 1952 |
| 2,622,442 | Boisblanc | Dec. 23, 1952 |